United States Patent
Subramanian et al.

(10) Patent No.: US 11,961,027 B2
(45) Date of Patent: Apr. 16, 2024

(54) METHODS AND SYSTEMS FOR EFFECTIVE UTILIZATION OF AUTONOMOUS MACHINES

(71) Applicant: Caterpillar Inc., Peoria, IL (US)

(72) Inventors: Gautham Subramanian, Peoria, IL (US); Vijayakumar Ramasamy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/188,775

(22) Filed: Mar. 1, 2021

(65) Prior Publication Data
US 2021/0279661 A1 Sep. 9, 2021

Related U.S. Application Data

(60) Provisional application No. 62/986,346, filed on Mar. 6, 2020.

(51) Int. Cl.
| | | |
|---|---|---|
| *G06Q 10/00* | (2023.01) | |
| *G05B 15/02* | (2006.01) | |
| *G06Q 10/0631* | (2023.01) | |
| *G06Q 50/08* | (2012.01) | |

(52) U.S. Cl.
CPC ....... *G06Q 10/06313* (2013.01); *G05B 15/02* (2013.01); *G06Q 50/08* (2013.01)

(58) Field of Classification Search
CPC ............. G06Q 10/06313; G06Q 50/08; G06Q 10/06316
See application file for complete search history.

(56) References Cited

U.S. PATENT DOCUMENTS

| | | |
|---|---|---|
| 7,731,450 B2 | 6/2010 | Congdon et al. |
| 8,116,950 B2 | 2/2012 | Glee |
| 10,180,328 B2 | 1/2019 | Matthews |
| 10,474,338 B2 | 11/2019 | Marsolek |
| 2005/0060127 A1* | 3/2005 | Carter, Jr. ................ E21F 5/00 702/188 |
| 2006/0047377 A1* | 3/2006 | Ferguson ............ G05D 1/0297 701/2 |

(Continued)

FOREIGN PATENT DOCUMENTS

WO 2017171073 10/2017

OTHER PUBLICATIONS

Written Opinion and International Search Report for International Patent Appln No. PCT/US2021/021031, dated Jun. 23, 2021 (11 pgs).

*Primary Examiner* — Brian M Epstein
*Assistant Examiner* — Reham K Abouzahra (57) ABSTRACT

Systems and methods are disclosed for optimal utilization of machines for performing tasks across a predetermined area. A request may be received to initiate a job on a predetermined area, the job comprising a plurality of tasks associated with a plurality of machines. In response to the request, a first machine of the plurality of machines may be deployed to the predetermined area to execute a first task of the plurality of tasks autonomously. A deployment event may be determined based on characteristics of the first machine and a second machine, and based on characteristics of the predetermined area. The second machine to the predetermined area, upon detection of the deployment event, to execute a second task of the plurality of tasks autonomously.

20 Claims, 5 Drawing Sheets

(56) References Cited

U.S. PATENT DOCUMENTS

| | | | |
|---|---|---|---|
| 2011/0311102 A1* | 12/2011 | McDaniel | G05D 1/0251 382/104 |
| 2012/0215351 A1* | 8/2012 | McGee | B25J 9/1676 700/248 |
| 2014/0365258 A1* | 12/2014 | Vestal | G05D 1/0297 901/1 |
| 2015/0379457 A1* | 12/2015 | Jackson | G06Q 10/06398 705/7.17 |
| 2016/0082954 A1* | 3/2016 | Rennemann | E02F 3/651 701/50 |
| 2016/0146611 A1* | 5/2016 | Matthews | A01B 79/005 701/533 |
| 2016/0222602 A1 | 8/2016 | Downing | |
| 2017/0149875 A1* | 5/2017 | Iyengar | H04L 41/5051 |
| 2017/0282368 A1* | 10/2017 | Johnson | B25J 9/1666 |
| 2018/0133997 A1* | 5/2018 | Rathmann | G05B 19/04 |
| 2018/0143975 A1* | 5/2018 | Casal | G06F 40/51 |
| 2018/0257228 A1* | 9/2018 | Tingler | B25J 9/1669 |
| 2019/0186094 A1 | 6/2019 | Marsolek et al. | |
| 2020/0050192 A1 | 2/2020 | O'Donnell et al. | |
| 2020/0150687 A1* | 5/2020 | Halder | G05D 1/0291 |

* cited by examiner

METHODS AND SYSTEMS FOR EFFECTIVE UTILIZATION OF AUTONOMOUS MACHINES

CROSS-REFERENCE TO RELATED APPLICATIONS

This application claims the benefit of priority under 35 U.S.C. § 119 to U.S. Provisional Patent Application No. 62/986,346, filed on Mar. 6, 2020, the entirety of which is incorporated herein by reference.

TECHNICAL FIELD

The present disclosure relates generally to effective utilization of machines to perform tasks in an autonomous manner.

BACKGROUND

In construction applications, including with the grading and compaction of dirt and other substrates on construction sites, autonomous and semi-autonomous machines may be used to perform certain tasks. Problems may arise in utilizing and coordinating these autonomous machines.

The systems and methods of the present disclosure may solve one or more of the problems set forth above and/or other problems in the art. The scope of the current disclosure, however, is defined by the attached claims, and not by the ability to solve any specific problem.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In one embodiment, a method of optimal utilization of machines for performing tasks across a predetermined area may comprise receiving a request to initiate a job on a predetermined area, the job comprising a plurality of tasks associated with a plurality of machines. In response to the request, a first machine of the plurality of machines may be deployed to the predetermined area to execute a first task of the plurality of tasks autonomously. A deployment event may be determined based on characteristics of the first machine and a second machine, and based on characteristics of the predetermined area. The second machine may be deployed to the predetermined area, upon detection of the deployment event, to execute a second task of the plurality of tasks autonomously.

In another embodiment, a system of optimal utilization of machines for performing tasks across a predetermined area is disclosed. The system may include at least one processor and at least one non-transitory computer-readable medium storing instructions that, when executed by the one or more processors, cause the processor to perform operations comprising receiving a request to initiate a job on a predetermined area, the job comprising a plurality of tasks associated with a plurality of machines. In response to the request, a first machine of the plurality of machines may be deployed to the predetermined area to execute a first task of the plurality of tasks autonomously. A deployment event may be determined based on characteristics of the first machine and a second machine, and based on characteristics of the predetermined area. The second machine may be deployed to the predetermined area, upon detection of the deployment event, to execute a second task of the plurality of tasks autonomously.

In another embodiment, a method of optimal utilization of machines for performing tasks across a predetermined area may comprise receiving a request to initiate a job on a predetermined area, the job comprising a plurality of tasks associated with a plurality of machines. In response to the request, a first machine of the plurality of machines may be autonomously deployed to the predetermined area to execute a first task of the plurality of tasks autonomously. A deployment event may be determined based on characteristics of the first machine and a second machine, and based on characteristics of the predetermined area. The second machine may be autonomously deployed to the predetermined area, upon detection of the deployment event, to execute a second task of the plurality of tasks autonomously.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises, has, or includes a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in the stated value. The term "exemplary" is used in the sense of "example" rather than "ideal." As used herein, the singular forms "a," "an," and "the" include plural reference unless the context dictates otherwise.

Figure 1:
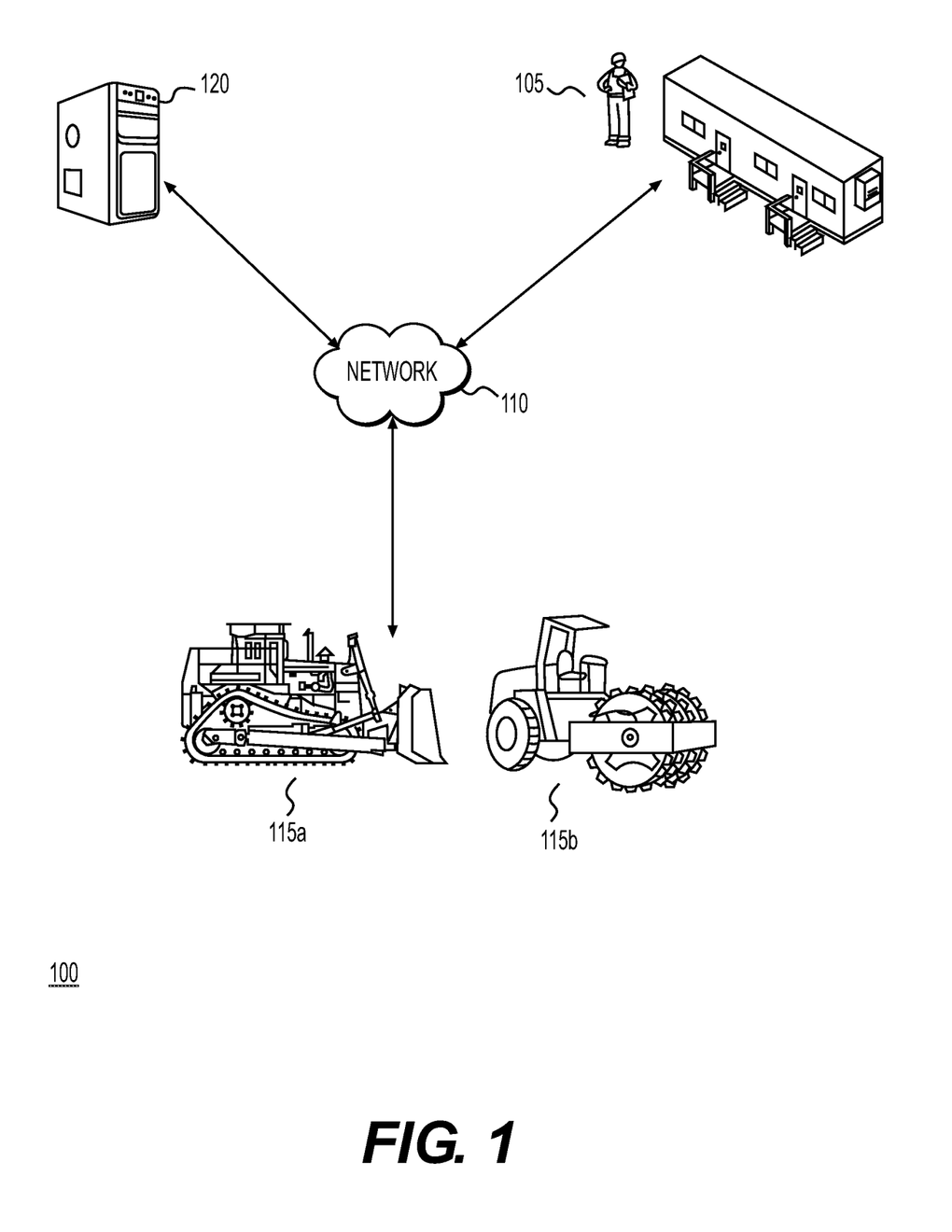
FIG. 1 depicts an exemplary embodiment of a machine utilization optimization system, according to techniques presented herein.

FIG. 1 depicts an exemplary embodiment of a machine utilization optimization system 100, according to techniques presented herein. At least one operator 105 may interact with a network 110 to communicate with and/or control the operation of one or more machines 115. The operator 105 may be located within line-of-sight (LOS) of the machines 115, and may communicate with and/or control the machines 115 via a remote control device. Alternatively, the operator 105 may be located in a back office on-site or off-site from where the machines 115 are being utilized. The operator 105 may also be located inside the machines 115, where he or she may be able to directly control machines 115. Some or all or the operations of the machines 115 may occur without operator engagement, and hence the machines 115 may operate autonomously or semi-autonomously. For example, the machines 115 may have onboard software controlling some or all of their operations, and/or the machines 115 may be partially or completely controlled by instructions received from server(s) 120 across the network 110. While depicted as separate from the operator 105, the server 120 may be directly accessible to the operator 105. The server 120 may execute machine utilization software to control the machines autonomously, as will be discussed further herein.

For a given plot of land utilizing multiple machines 115, which may be referred to as a "work site" herein, a number of challenges arise with efficient and safe utilization. For safety reasons, machines 115 might not be allowed to come within a predetermined distance of each other. However, all other things being equal, the work site preparation will be accomplished faster if there are multiple machines operating on the work site at once. Often a machine must wait for another machine to treat a given portion of a work site before it may begin its own mission. Thus, machines may be waiting for each other, which is costly and inefficient. Yet, if the second machine begins its mission too early, it may catch up to the first machine, requiring the first machine to stop repeatedly during the first machine's mission, which is also inefficient, and may lead to safety issues. Techniques are discussed herein to resolve these and other challenges.

The machines 115 may have certain on-board safety protocols that may cause them to deny certain task requests received from operator 105 and/or server 120. For example, a machine may stop if it detects a person, object, or other machine within a predetermined proximity. The machine may also decline any task/mission instruction received if, for example, the detected grade of an area is too steep, or other site characteristics are not considered safe. In addition, each machine 115 may have minimum working area requirements. Accordingly, if the server 120 instructs a machine to perform a mission/task to treat an area smaller than the minimum, the machine may decline the mission.

The machines 115 may be continuously reporting their location, speed, surroundings, and/or other situational data back to the server 120 and/or operator 105. The server 120 and/or operator 105 may use this data to determine subsequent instructions to the machines 115. For example, the server 120 may instruct a machine 115a to stop if it comes within a predetermined area being utilized by machine 115b, even if on-board proximity sensors of machine 115b have not yet been tripped. This feature may be especially advantageous for a fleet of autonomous machines operating at a remote location.

Figure 2:
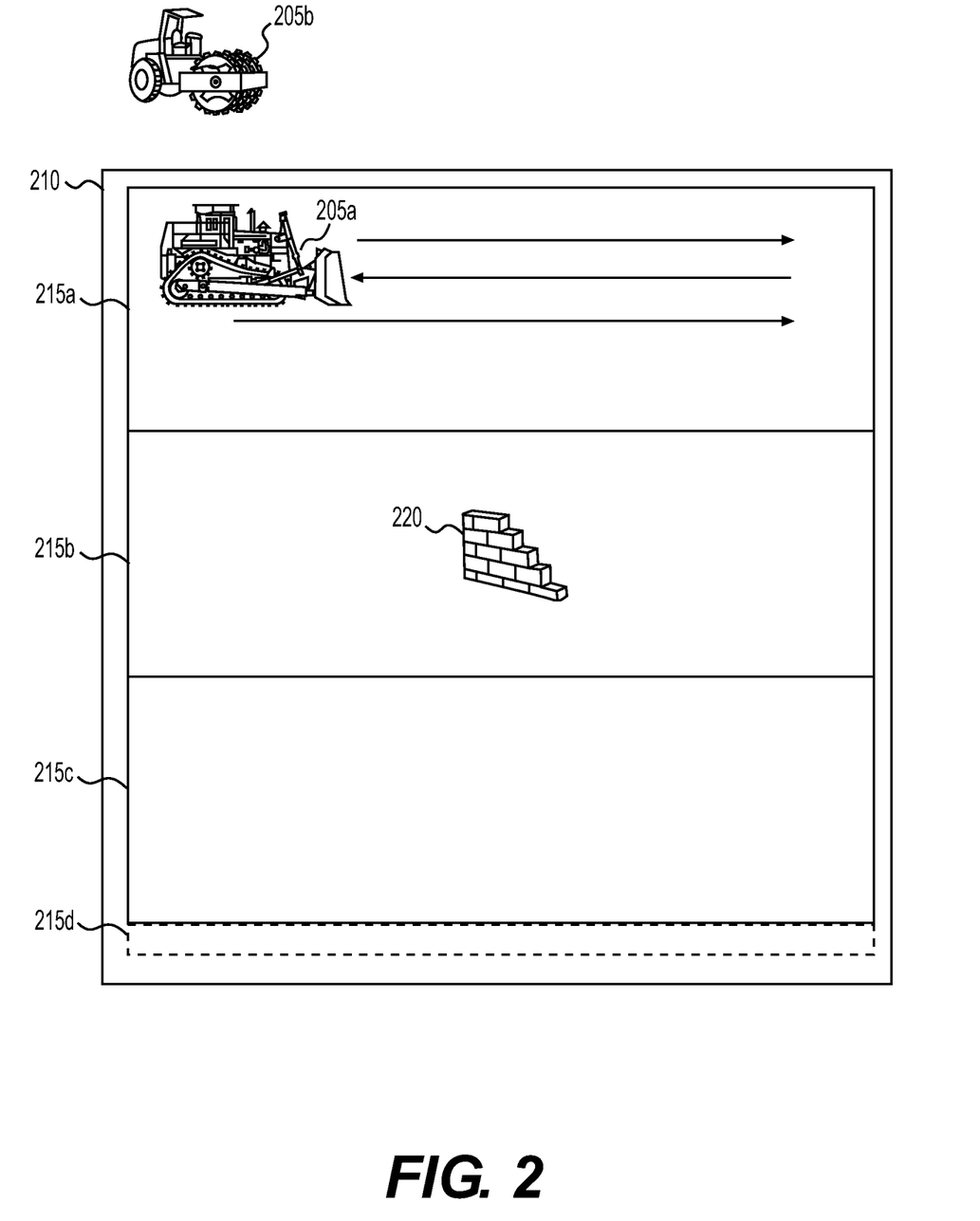
FIG. 2 depicts an exemplary land area for machine utilization, according to techniques presented herein.

FIG. 2 depicts an exemplary work site for machine utilization, according to techniques presented herein. In the figure, work site 210 is to be is being operated first by machine 205a, and then by a different type of machine 205b. In this example, machine 205a is a motor grader, and machine 205b is a compactor. Once the grading of the work site 210 is completed by the motor grader 205a, the work site may be compacted by the compactor 205b. In an autonomous environment, via the utilization application algorithm, the server 120 may seamlessly and autonomously coordinate the operation of the two machines to complete their respective missions on the work site 210.

A first goal may be to have both machines operating at once, in order to minimize the time that each machine is in an idle state. A second goal may be to avoid unwanted task creation from the back office for creating subsequent tasks. For example, the operator 105 in the back office may prefer to simply send one request to the server 120 to have the work site 210 graded and compacted. However, if the compactor 205b is sent out too early, it may catch up to the motor grader 205a, or otherwise come within a predetermined distance of the motor grader 205a, which may cause one or both of the machines to stop and/or disengage autonomous mode at various locations on the work site 210. At this point the operator 105 may have to send another task request to reinitiate the mission. If the compactor 205b catches the motor grader 205a again, intervention by the back office may again be required, and so on. Accordingly, the server 120 may instruct the compactor 205b to stay in an idle state for a specific amount of time. Once the specific amount of time is elapsed the compactor 205b may resume the mission. The passage of specific amount of time allows the compactor 205b to operate without catching up or interfering with the operation of the motor grader 205a on the work site 210. The specific amount of time may be determined based upon the specified, measured, or desired average speed of each machine, the site characteristics, etc., as will be discussed further below.

Further challenges may arise with having two autonomous machines operating simultaneously on the work site 210. The boundary of the work site may be large, and, if left on their own to operate autonomously, machine 205b may perform work on an area that has not yet been treated by machine 205a. To avoid the aforementioned challenges, the work area may be divided into a plurality of segments, such as segments 215a-215d.

Machines 205a and 205b may be prohibited from entering any segment 215a-215d occupied by another machine. If any machine leaves a segment to which it is assigned, it may automatically be brought out of autonomous mode and/or stopped, for example by server 120. This may both improve safety and reduce the likelihood that a machine will treat an area out of turn. For example, the tractor 205a may first grade segment 215a, then move on to segment 215b. At this time, the server 120 may instruct the compactor 205b to begin work on segment 215a. Alternatively, the server 120 may determine that compactor 205b will likely finish segment 215a before the tractor 205a finishes segment 215b. In such an instance, the server 120 may have the compactor 205b wait longer in order to avoid a stoppage.

When determining the work site segment sizes, on the one hand a smaller segment may improve the utilization percentage of the machines, since it may allow a second machine to start on the work site sooner. However, larger segments may improve safety, in keeping machines further apart, and may help ensure that machines can get around any obstacles without leaving their segment, such as obstacle 220. The site manager may configure a desired segment size based on the nature of the mission, nature of the task and the like.

In one embodiment, the server 120 may attempt to define work site segments as small as possible while factoring in a variety of considerations, including 1) machine dynamics, 2) site attributes, 3) possible utilization ratios of the machines, and/or 4) safety.

Machine dynamics may include machine height, measured/specified/desired speed of the machine, and/or overall size of the machine. Additionally, the machine type, turn over radius, and maneuver area required to turn the machine may also be considered. For larger machines moving at a faster speed, the segment size may need to be increased. This is because larger and/or faster machines may need more room to slow down before stopping upon reaching the end of the segment. For example, the server may determine that a machine that moves at 6 km/hour requires 15 feet of stopping distance. The size and speed of the machine, required stopping distance, turning radius, etc., may separately or together put a lower bound on minimum size of the segment.

The machine itself may have internal checks that may cause it to decline the proposed segment boundary. For example, if the server 120 provides a segment that is 15 feet long, the machine may decline, as the machine itself may have sensors that require 15 feet in front of the machine unobstructed to even begin moving. Accordingly, each machine may have corresponding minimum segment size requirements. The server 120 may be aware of these machine-specific minimum predetermined dimensions, and may ensure that any proposed segment size is larger than these dimensions.

As discussed above, the server 120 may also consider site attributes when determining segment sizes. Possible paths may be considered. For example, if the grade of the work site 210 only permits or requires one or more of the machines to move back and forth in an east/west (or some other) direction, then segments may be defined such that the long side of the segment is in the east/west direction. Server 120 may also consider how far away the idling/parking area for the machines is from the work site 210 (for example, there may be some restrictions that subsequent machines need the boundary to be a minimum of a predetermined number of feet). Additionally, the type of substrate, topology, or starting level of compaction on the work site 210 may be considered, as this may affect the speed at which the machines can move, and thus the required stopping distances, etc.

Obstacles 220 on the work site 210 may also be considered. For example, the algorithm executed by the server 120 may expand the size of an individual segment to ensure that any machines can get around any obstacles without straying into another segment. For example, in response to determining obstacle 220, the server 120 may enlarge segment 215b beyond other segments lacking obstructions. Accordingly, the segments are not necessarily identically sized.

As discussed above, the utilization ratio may also affect segment size. The server 120 may seek to maximize the utilization of the machines 205. Once a machine is brought up from the parking/idling area, it may be a goal that it is used continuously until no longer needed. This is both to complete the tasks on the work site 210 as quickly as possible, as well as to prevent stoppages that may require back office/operator 105 intervention. The goal may be to have consecutive machines with equal utilization ratios. The utilization ratios may correspond to the percentage of time a given machine is used between when it is initially summoned and when its mission is complete. If the segment size is too large, for example, subsequent machines such as the compactor 205b may sit idle for much longer than required to achieve continuous usage. As a result, utilization ratio considerations may encourage as small a segment size as possible, without infringing any requirements from one of the other considerations.

Considerations of effective utilization may also include the degree to which the machines involved with the job move in the same direction. The quality of the final work site surface may be of higher quality if the machines move in at least approximately the same orientation. Segments may accordingly be shaped as longer rectangles so that autonomous machines will all have to perform their missions in substantially the same direction.

Finally, safety considerations may affect the selection of the segment size. The machines may require a minimum radius in front or around them to remain clear, for example. Pit holes and other obstacles may be considered. Pending weather may be considered. Possible or likely human intervention scenarios may be considered. The needed size of the maneuverability area may be considered. Thus, safety considerations may set a lower limit on the segment size.

The server 120 might automatically extend the segment boundary, if possible, to ensure that the entire segment area is treated with the task. For example, the corners of the segment might not otherwise receive grading, compaction, or whatever the intended task requires, since the machine will not be able to go up to the very edge of the segment. Thus, a boundary extension may be determined machine-by-machine, as different machines have different turning radiuses, etc.

As the algorithm on the server 120 iterates across the work site 210 determining segments, there may be a slightly too small end segment, as shown in segment 215d. In such a case, in order to avoid having a segment size that violates the safety and machine considerations, etc., discussed above, the smaller segment may be absorbed into the nearest full-sized segment. For example, segment 215d may be incorporated into segment 215c.

Accordingly, an algorithm on the server 120 may automatically segment the work site based upon the above considerations. This may be performed upon receiving a task request from the operator 105. As a result, the operator 105 might never need to determine segments, schedule machine movements or start times, etc.

Figure 3:
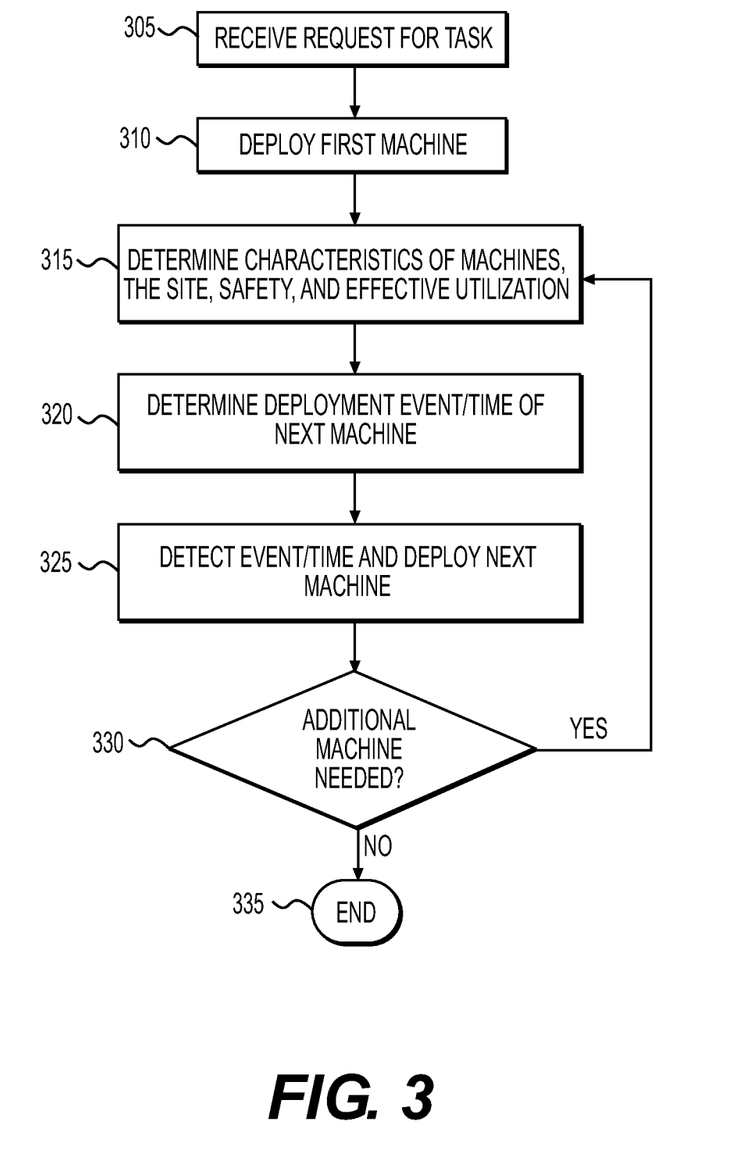
FIGS. 3-4 are flowcharts illustrating exemplary methods of machine utilization optimization, according to techniques presented herein.

FIG. 3 is a flowchart illustrating an exemplary method of machine utilization optimization, according to techniques presented herein. At step 305, a request may be received to perform a task. This may be a request from the operator 105 received at the server 120 to complete a task requiring multiple machines to perform tasks/missions on a work site 210.

At step 310, in one embodiment a first machine may be deployed to perform a mission on the work site 210. Alternatively, the first machine might only be deployed after segments, etc., are determined, such as at step 325. For example, before deploying any machines, server 120 may develop a work site plan designating machines used, events that will trigger their deployment, time estimates, speeds, and/or segments, etc. Alternatively or additionally, a first machine may be deployed, and feedback information from the first machine may be used to create or update the work site plan. As discussed above, this first machine may provide information back to the server 120 and/or operator 105, such as percent completed, estimated time remaining, and machine-specific progress indicators such as compaction metrics (over or under compacted surface in a map) in the case of a compactor.

At step 315, characteristics of the machines needed to perform the requested task, the work site 210, safety factors, and/or effective utilization information may be received. At this time, as discussed above, segments may be determined to divide up the work site 210. Alternatively, for example if segments are not determined, this information may simply be used to determine a start time of the next machine.

At step 320, an event or time for the deployment of the next machine may be determined. The location of the next machine relative to the work site 210 may be considered, and the machine may be summoned at a time that it may immediately begin work on the work site 210 upon arrival from the parking/idling area. The start time/event of the next machine may be modified based on the progress information being received from the first machine. For example, the server 120 may initially guess that compactor 205b may start compacting immediately when the tractor 205a enters segment 215b, which may be based on an estimated average speed of the tractor 205a. However, if the tractor 205a is making slower progress than expected, the server 120 might not instruct the compactor 205b to enter segment 215a until the tractor 205a reaches segment 215c. Alternatively, the server 120 might not instruct the compactor 205b to enter segment 215a until tractor 205a reaches a calculated location within segment 215b, or has completed a calculated portion/percentage of segment 215b.

Alternatively, the requested task from the operator 105 may require multiple machines of the same type. For example, if the work site 210 is entirely ready for compaction, and there are multiple compactors 205b available, one of each compactor may be assigned a mission by the server 120 to compact soil on one segment, or a collection of segments, simultaneously. Each compactor may be assigned to begin at the same end of the segment to which it is assigned. For example, the compactors may all begin at the northwest corner of their respective initial segment and work compacting towards the southwest corner of their segment. In this way the compactors are less likely to encounter each other at segment edges.

If at any time a machine or the server 120 determines that the machine cannot complete the segment, perhaps due to being stuck or disabled, the server 120 may determine if another machine is available that may complete the segment, or that may begin work on the following segment that would have been completed by the now unavailable machine. For example, if a machine is stuck in the mud in segment 215a, the entire segment may be temporarily taken down, and a replacement machine may be deployed to begin work on the subsequent segment 215b. Any subsequent machines may automatically begin their work also at segment 215b.

Machine learning techniques may additionally be employed to help determine the deployment event/time that will cause the next machine to be summoned. For example, in one embodiment the purported speed of the machine and apparent site characteristics may be used to determine when the second machine is released, brought out of parking, etc. Alternatively, the server 120 may utilize a machine-learning system that compares features of the current site, machines, etc., to similar construction sites and historical data associated therewith. For example, at least one feature vector, associated with the current work site 210, may be created using machine dynamics data and/or site attributes data and/or utilization ratio data and/or safety data. This feature vector may be compared to prior feature vectors associated with other construction sites that have already been completed in order to predict when the second or subsequent machines will be needed. This process may be performed iteratively, as data is received from machines operating on the work site.

Similar machine learning techniques may be used to determine segment size. For example, the historical data may indicate that, for this type of soil, the stoppage distance or maneuver area is larger than the specifications indicate. By comparing feature vectors of the current work site 210 with feature vectors of prior completed work sites, the optimum segment size may be more accurately determined.

At step 325 the event or time for deployment of the next machine may be detected, and the next machine may then be deployed. For example, if it is determined that the tractor 205a has exited segment 215a, the compactor 205b may be instructed to begin compaction on segment 215a. The second machine may also provide information back to the operator 105 and server 120. For example, after the compactor 205b begins its mission compacting the compaction targets, it may report location, pass, machine driver power (MDP) level-of-compaction information, compaction meter value (CMV) level-of-compaction information, etc. This information may be used to help determine a start event or time for any subsequent machines, and may be used to determine when to automatically move machines from the parking area to the work site 210. Machines may be moved from the parking/idling area with a universal remote operator station (UROS), non-line of sight (NLOS), etc.

In following these steps, multiple machines may safely and efficiently work on the work site 210 simultaneously. These steps may be performed iteratively. At step 330, if it is determined that an additional machine is needed, the algorithm, which may be located on server 120, may loop back to step 315 and begin again.

If no more machines are required to treat the work site 210, the process may end at step 335.

Figure 4:
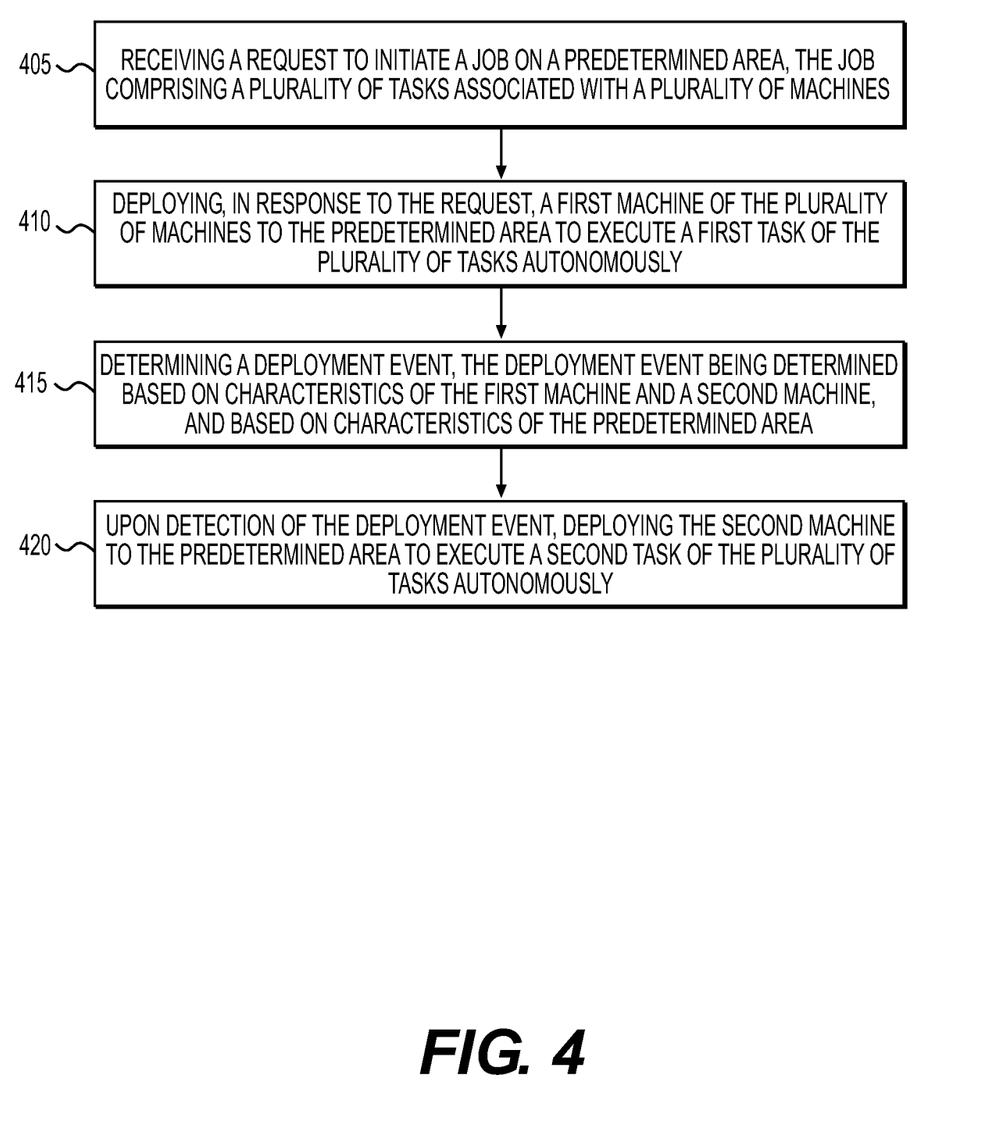

FIG. 4 is a flowchart illustrating an exemplary methods of machine utilization optimization, according to techniques presented herein. At step 405, a request may be received, for example at server 120, to initiate a job on a predetermined area, the job comprising a plurality of tasks associated with a plurality of machines, for example machines 115/205.

At step 410, in response to the request, the server 120 may deploy a first machine of the plurality of machines to the predetermined area to execute a first task of the plurality of tasks autonomously.

At step 415, a deployment event may be determined based on the characteristics of the first machine and a second machine. The deployment event may further be determined based on characteristics of the predetermined area. The deployment event may comprise, as discussed above, the first machine entering a predetermined segment, or the first machine reaching a predetermined location such that the second machine will be able to perform its task without interruption, or the first machine a predetermined portion of its task or segment, for example. The deployment event may also be modified based on data received from the first machine. For example, if the first machine is moving slower or faster than expected, or has mechanical or movement/terrain problems.

At step 420, the deployment event may be detected, which may result in the server 120 deploying the second machine to the predetermined area to execute a second task of the plurality of tasks autonomously.

Figure 5:
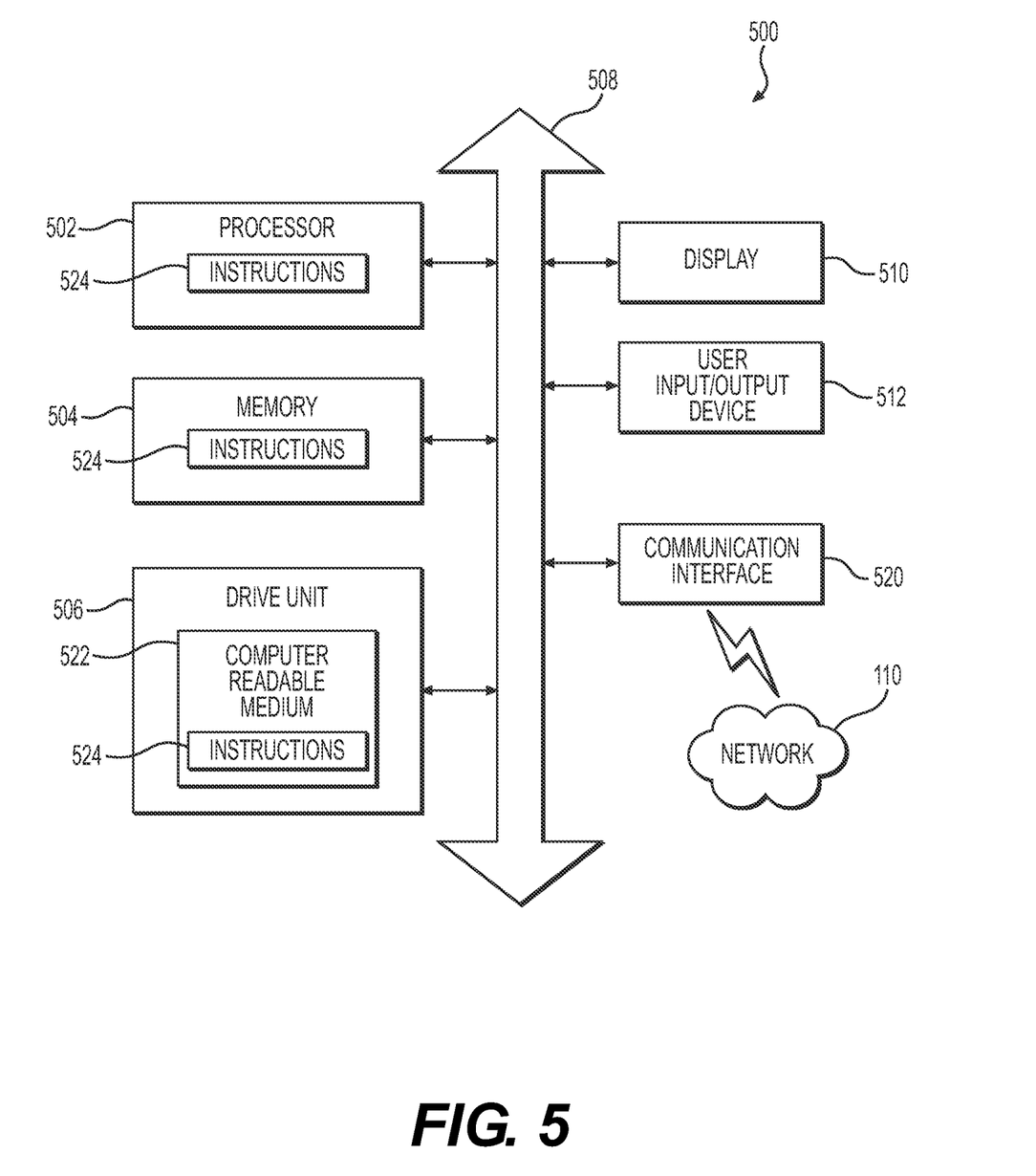
FIG. 5 illustrates an implementation of a computer system that may execute techniques presented herein.

FIG. 5 illustrates an implementation of a computer system 500, which may correspond to server 120 and/or any device(s) used by operator 105. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 02, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user, such as operator 105, to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g. software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 110 can communicate voice, video, audio, images, or any other data over the network 110. Further, the instructions 524 may be transmitted or received over the network 110 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 110, external media, the display 510, or any other components in computer system 500, or combinations thereof. The connection with the network 110 may be a physical connection, such as a wired Ethernet connection or may be established wirelessly as discussed below. Likewise, the additional connections with other components of the computer system 500 may be physical connections or may be established wirelessly. The network 110 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 is non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 110. The network 110 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 110 may include wide area networks (WAN), such as the Internet, local area networks (LAN), campus area networks, metropolitan area networks, a direct connection such as through a Universal Serial Bus (USB) port, or any other networks that may allow for data communication. The network 110 may be configured to couple one computing device to another computing device to enable communication of data between the devices. The network 110 may generally be enabled to employ any form of machine-readable media for communicating information from one device to another. The network 110 may include communication methods by which information may travel between computing devices. The network 110 may be divided into sub-networks. The sub-networks may allow access to all of the other components connected thereto or the sub-networks may restrict access between the components. The network 110 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a programmed controller or computer. Those skilled in the relevant art will appreciate that aspects of the present disclosure can be practiced with other communications, data processing, or computer system configurations, including: Internet appliances, hand-held devices, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium.

INDUSTRIAL APPLICABILITY

The present disclosure may find application in autonomous machines operating over an area, such as at a construction site.

The present disclosure may help enable multiple autonomous machines to operate over a work site efficiently, while still ensuring safety.

Another aspect of the above disclosure is deployment times of machines may be calculated such that they may be operated continuously without stoppage.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A method of optimal utilization of work machines for performing tasks across a predetermined work area, the method comprising:

electronically receiving, using processing circuitry, a single request to initiate a job on the predetermined work area that includes a first segment and a second segment, the job comprising a plurality of tasks associated with a plurality of machines;

deploying, using the processing circuitry, in response to the single request, a first machine of the plurality of machines to the predetermined work area to execute a first task of the plurality of tasks autonomously;

electronically receiving, using the processing circuitry, information indicating a location of the first machine in the first segment;

determining, using the processing circuitry, whether the first machine in the first segment will be able to trigger a deployment event to deploy a second machine of the plurality of machines based on operation of the first machine in the first segment toward autonomously completing the first task;

determining, using the processing circuitry, and prior to deploying any additional machines of the plurality of machines to the first segment, that the first machine will be unable to trigger the deployment event;

in response to said determining that the first machine will be unable to trigger the deployment event, without another request to initiate the job being received, and prior to occurrence of the triggering event, outputting signaling, using the processing circuitry, to automatically deploy a third machine proximate to the location of the first machine, to execute the first task of the plurality of tasks autonomously instead of the first machine continuing to execute the first task;

automatically deploying, in response to the signaling to automatically deploy the third machine, and without another request to initiate the job being received, the third machine to execute the first task of the plurality of tasks autonomously and trigger the deployment event;

determining, using the processing circuitry, occurrence of the deployment event triggered by the third machine, the deployment event triggered by the third machine being determined based on characteristics of the third machine and the second machine, and based on characteristics of the predetermined work area, including determining that the first machine is no longer in the first segment and that the third machine has entered the second segment of the predetermined work area based on information indicating location of the third machine in the first segment;

in response to determining the occurrence of the deployment event and based on the third machine entering the second segment, and without another request to initiate the job being received, outputting signaling, using the processing circuitry, to deploy the second machine to the first segment of the predetermined work area to execute a second task of the plurality of tasks autonomously; and in response to the signaling to deploy the second machine, and without another request to initiate the job being received, deploying, using the processing circuitry, the second machine to the first segment of the predetermined area to execute the second task of the plurality of tasks autonomously, wherein the single request to initiate the job on the predetermined work area is the only request to perform the job by way of the second machine and a combination of the first machine and the third machine, wherein occurrence of the deployment event triggered by the third machine is determined prior to the third machine leaving the first segment, and wherein the second task is based on the first task and cannot occur without the first task being completed.

2. The method of claim 1, wherein said determining the occurrence of the deployment event triggered by the third machine comprises:

dividing the predetermined work area into a plurality of segments, including the first segment and the second segment, wherein a size of each of the plurality of segments is based on the characteristics of the third machine and the second machine, and based on the characteristics of the predetermined work area.

3. The method of claim 2, wherein the deployment event triggered by the third machine is triggered when the third machine enters the second segment of the plurality of segments to perform grading work.

4. The method of claim 2, wherein the first machine and the third machine are not permitted to be present simultaneously within a same segment of the plurality of segments as the second machine while performing any of the plurality of tasks on the predetermined work area.

5. The method of claim 2, further comprising:

upon detection of the first machine and second machine within a same segment of the plurality of segments, discontinuing autonomous mode associated with the first machine and the second machine.

6. The method of claim 1, wherein said determining the occurrence of the deployment event triggered by the third machine event further comprises:

determining when deployment of the second machine will result in continuous operation of the second machine until a third task associated with the second machine is completed.

7. The method of claim 1, further comprising:

determining a second deployment event, upon detection of which a fourth machine is deployed to the predetermined work area, the second deployment event being based on characteristics of the second machine, the third machine, and the fourth machine, and based on the characteristics of the predetermined work area; and upon detection of the second deployment event, deploying the fourth machine to the predetermined work area.

8. The method of claim 1, wherein the deployment event triggered by the third machine is modified based on data received from the third machine.

9. The method of claim 1, wherein said determining the occurrence of the deployment triggered by the third machine event further comprises:

determining a first feature vector, the first feature vector comprising data related to characteristics of the third machine and the second machine, and characteristics of the predetermined work area; and determining the deployment event based on a comparison of the first feature vector with a plurality of completed job feature vectors, the completed job feature vectors comprising data related to characteristics of machines and characteristics of areas associated with previously completed jobs on a plurality of predetermined work areas including the predetermined work area.

10. A system for optimal utilization of work machines for performing tasks across a predetermined work area, comprising:

one or more processors; and at least one non-transitory computer readable medium storing instructions which, when executed by the one or more processors, cause the one or more processors to perform operations comprising:

electronically receiving a single request to initiate a job on the predetermined work area, the job comprising a plurality of tasks associated with a plurality of machines;

electronically receiving information indicative of one or more characteristics of a first machine of the plurality of machines;

setting a size of the predetermined work area based on the received one or more characteristics of the first machine;

deploying, in response to the single request, a first machine of the plurality of machines to the predetermined work area to execute a first task of the plurality of tasks autonomously;

determining whether the first machine will be able to trigger a deployment event to deploy a second machine of the plurality of machines based on operation of the first machine in the predetermined work area toward autonomously completing the first task;

determining, prior to deploying any additional machines of the plurality of machines to the first segment, that the first machine will be unable to trigger the deployment event;

in response to said determining that the first machine will be unable to trigger the deployment event, without another request to initiate the job being received, and prior to occurrence of the triggering event, automatically deploying a third machine to execute the first task of the plurality of tasks autonomously and trigger the deployment event instead of the first machine continuing to execute the first task;

determining occurrence of the deployment event triggered by the third machine, the deployment event triggered by the third machine being determined based on characteristics of the third machine and the second machine, and based on characteristics of the predetermined work area; and upon detection of the deployment event triggered by the third machine, and without another request to initiate the job being received, deploying the second machine to the predetermined work area to execute a second task of the plurality of tasks autonomously, wherein the single request to initiate the job on the predetermined work area is the only request to perform the job by way of the second machine and a combination of the first machine and the third machine, and wherein the second task is based on the first task and cannot occur without the first task being completed by the third machine.

11. The system of claim 10, wherein said determining the occurrence of the deployment triggered by the third machine event comprises:
dividing the predetermined work area into a plurality of segments, wherein a size of each of the plurality of segments is based on a speed of the third machine, and based on the characteristics of the predetermined work area.

12. The system of claim 11, wherein the deployment event triggered by the third machine is one of the third machine reaching a predetermined location such that the second machine will be able to perform the second task without interruption, or the third machine has completed a predetermined portion of the first task.

13. The system of claim 11, the operations further comprising:
upon detection of the third machine and second machine within a same segment of the plurality of segments, discontinuing autonomous mode associated with the third machine and the second machine.

14. The system of claim 10, wherein said determining the occurrence of the deployment event triggered by the third machine further comprises:
determining when deployment of the second machine will result in continuous operation of the second machine until a third task associated with the second machine is completed.

15. The system of claim 10, the operations further comprising:
determining a second deployment event, upon detection of which a fourth machine is deployed to the predetermined work area, the second deployment event being based on characteristics of the second machine, the third machine, and the fourth machine, and based on the characteristics of the predetermined work area; and
upon detection of the second deployment event, deploying the fourth machine to the predetermined work area.

16. The system of claim 10, wherein the deployment event triggered by the third machine is modified based on data received from the third machine.

17. The system of claim 10, wherein said determining the occurrence of the deployment event triggered by the third machine further comprises:
determining a first feature vector, the first feature vector comprising data related to characteristics of the third machine and the second machine, and characteristics of the predetermined work area; and
determining the deployment event based on a comparison of the first feature vector with a plurality of completed job feature vectors, the completed job feature vectors comprising data related to characteristics of machines and characteristics of areas associated with previously completed jobs on a plurality of predetermined work areas including the predetermined work area.

18. A computer-implemented method of optimal utilization of machines for performing tasks across a predetermined work area on a construction site that includes a first segment and a second segment, the computer-implemented method comprising:
electronically receiving a request to initiate a job on the predetermined work area, the job comprising a plurality of tasks associated with a plurality of machines;
autonomously deploying, in response to the single request, a first machine of the plurality of machines to the first segment of the predetermined work area to execute a first task of the plurality of tasks autonomously;
determining a location of the first machine in the first segment as the first machine performs grading work;
determining whether the first machine in the first segment will be able to trigger a deployment event to deploy a second machine of the plurality of machines based on operation of the first machine in the first segment toward autonomously completing the first task;
determining, prior to deploying any additional machines of the plurality of machines to the first segment, that the first machine will be unable to trigger the deployment event;
in response to said determining that the first machine will be unable to trigger the deployment event, without another request to initiate the job being received, and prior to occurrence of the triggering event, outputting signaling to deploy a third machine to execute the first task of the plurality of tasks autonomously instead of the first machine continuing to execute the first task;
deploying, in response to the signaling automatically deploy the third machine, the third machine to complete execution of the first task of the plurality of tasks autonomously and trigger the deployment event;
determining occurrence of the deployment event triggered by the third machine, the deployment event triggered by the third machine being determined based on characteristics of the third machine and the second machine, and based on characteristics of the predetermined work area, including determining that the first machine is no longer in the first segment and that the third machine has entered the second segment to perform grading work, based on information indicative of location of the third machine relative to the first segment; and
in response to determining the occurrence of the deployment event triggered by the third machine, and without another request to initiate the job being received, autonomously deploying the second machine to the first segment of the predetermined work area to execute a second task of the plurality of tasks autonomously,
wherein the single request to initiate the job on the predetermined work area is the only request to perform the job by way of the second machine and a combination of the first machine and the third machine,
wherein occurrence of the deployment event is determined prior to the third machine leaving the first segment, and
wherein the second task is based on the first task and cannot occur without the first task being completed by the third machine.

19. The computer-implemented method according to claim 18, further comprising:
determining a second deployment event, upon detection of which a fourth machine is deployed to the predetermined work area, the second deployment event being based on characteristics of the second machine, the third machine, and the fourth machine, and based on the characteristics of the predetermined work area; and
upon detection of the second deployment event, deploying the fourth machine to the predetermined work area.

20. The computer-implemented method according to claim 18, wherein the first machine and the third machine are not permitted to be present simultaneously within a same segment of the plurality of segments as the second machine while performing any of the plurality of tasks on the predetermined work area.

* * * * *